(12) United States Patent
Champion

(10) Patent No.: US 7,634,945 B2
(45) Date of Patent: Dec. 22, 2009

(54) APPARATUS TO WATER DETECTION IN A STORAGE TANK

(75) Inventor: James Robert Champion, Maryville, TN (US)

(73) Assignee: Robertshaw Controls Company, Carol Stream, IL (US)

( * ) Notice: Subject to any disclaimer, the term of this patent is extended or adjusted under 35 U.S.C. 154(b) by 264 days.

(21) Appl. No.: 11/955,922

(22) Filed: Dec. 13, 2007

(65) Prior Publication Data

US 2009/0151446 A1 Jun. 18, 2009

(51) Int. Cl.
*G01F 23/30* (2006.01)
*G01F 23/00* (2006.01)

(52) U.S. Cl. .......................................... 73/306; 73/291
(58) Field of Classification Search ................... 73/306, 73/291; 324/637
See application file for complete search history.

(56) References Cited

U.S. PATENT DOCUMENTS

| | | | |
|---|---|---|---|
| 6,055,287 A | 4/2000 | McEwan | |
| 6,060,915 A | 5/2000 | McEwan | |
| 6,644,114 B1 | 11/2003 | McEwan | |
| 7,262,607 B2 * | 8/2007 | Champion et al. | .......... 324/639 |
| 2004/0046571 A1* | 3/2004 | Champion et al. | .......... 324/637 |
| 2004/0046572 A1* | 3/2004 | Champion et al. | .......... 324/637 |
| 2004/0059508 A1 | 3/2004 | Champion | |

* cited by examiner

*Primary Examiner*—Hezron Williams
*Assistant Examiner*—Nathaniel Kolb
(74) *Attorney, Agent, or Firm*—Reinhart Boerner Van Deuren P.C.

(57) ABSTRACT

An apparatus for measuring a level of a fluid and detecting water in a storage container is provided. The apparatus comprises a signal-based fluid level measurement apparatus and a water detection device. The signal-based fluid level measurement apparatus has a first multistatic probe conveying a first signal and a second multistatic probe conveying a second signal. The first and second multistatic probes are electrically coupled by a float-coupler. The signal-based fluid level measurement apparatus determines the level of the fluid in the storage container based at least in part on a time delay between the first and second signals. The water detection device is operably coupled to the fluid level measurement apparatus. The water detection device monitors at least one of conduction and a dielectric constant between exposed ends of the first and second multistatic probes. As such, a presence of the water in the storage tank is detected.

20 Claims, 1 Drawing Sheet

APPARATUS TO WATER DETECTION IN A STORAGE TANK

FIELD OF THE INVENTION

This invention generally relates to tank level sensors and, in particular, tank level sensors that utilize time domain reflectometry (TDR) techniques.

BACKGROUND OF THE INVENTION

A time domain reflectometry (TDR) level sensing device uses a technique that involves connecting a time domain reflectometer to a conductive element (e.g., a probe, a transmission line, etc.) and immersing the conductive element in a liquid. The time domain reflectometer generates a pulse (i.e., electromagnetic signal) that can exhibit an ultra wide band (UWB) frequency, can be pulse width modulated (PWM), can be formed by an impulse technique, and the like. The pulse generally propagates along and/or proximate the conductive element. A processor in or associated with the TDR level sensing device measures the time taken by the pulse to make a round trip between the reflectometer and the surface of the liquid. In other words, the processor measures a propagation delay from when the pulse leaves the TDR level sensing device to when the pulse returns to the TDR sensing device after having been reflected away from a surface of the liquid.

The TDR level sensing devices are able to provide accurate results since the propagation delay is independent of air temperature, pressure, humidity, and dielectric constant of the liquid. In fact, the precise location of the pulse reflection depends only on the location of the surface of the liquid. The technology behind such fluid level sensing has been referred to as Micropower Impulse Radar (MIR), Guided Wire or Wave Radar (GWR), and Impulse TDR. Some of the basic circuit patterns and methods of employing TDR level sensing are disclosed in U.S. Pat. Nos. 6,644,114, 6,060,915, and 6,055,287 to McEwan.

While the basic TDR level sensing devices of McEwan work well in many circumstances, in some cases the devices experience interference (e.g., ringing, saturation, etc.). If the interference becomes substantial, the reception of the reflected pulse might be compromised and the measurement of the level of the fluid in the tank would be skewed. Therefore, the known TDR level sensing devices were improved by using electrically separate transmitters and receivers, each of which was associated with its own conducting element, along with a float with a coupling device. In other words, bistatic and/or multistatic capabilities were incorporated into the known TDR level sensing devices. These improved TDR level sensing devices and/or systems are disclosed in U.S. Pub. Applns. 2004/0046571 and 2004/0046572 to Champion, et al., and U.S. Pub. Appln. 2004/0059508 to Champion.

Another benefit of the improved TDR level sensing devices was the ability to sense a dielectric mismatch boundary. The dielectric mismatch boundary is a boundary formed between adjacent fluids (e.g., air and gasoline, gasoline and water, and the like) due to the different dielectric constants of each fluid. During operation of the TDR level sensing device, the generated pulses are affected by the dielectric mismatch boundary or boundaries formed in the storage tank. As a result, the TDR level sensing device is able to determine the position of the dielectric mismatch boundary relative to the tank.

Unfortunately, the known TDR or the improved TDR level sensing devices are only able to accurately find the dielectric mismatch boundary between adjacent fluids. The devices were not designed to determine what each of the fluids forming the boundary happen to be. In other words, the TDR level sensing devices can tell a user that a first dielectric mismatch boundary exists, but will not inform the user if there are additional fluid boundaries some distance from the first. This is due to the attenuation of signals in most fluids. The TDR level sensing devices also fail to inform the user what fluids make up the mismatch boundary. As such, the user is unable to determine if, for example, one of the fluids is water.

One known capacitance-based fluid level sensor did have the ability to detect water. However, that sensor was hindered by fluid use restrictions and/or limitations. Specifically, the sensor did not perform as well when used in conjunction with fuels such as, for example, reformulated gasoline and alcohol/gasoline mixtures that exhibit dielectric absorption when measured with capacitance technologies. Because determining whether a fuel is contaminated with water is very desirable, the known capacitance-based fluid level sensor has at least one significant drawback.

Since many users and customers of TDR level sensing devices are interested in testing for water in the storage tank so that the water can be removed, it would be desirable to provide a TDR sensing device with a water sensing element. The invention provides such a device. These and other advantages of the invention, as well as additional inventive features, will be apparent from the description of the invention provided herein.

BRIEF SUMMARY OF THE INVENTION

Embodiments of the invention provides TDR level sensing device having a water sensing circuit. As such, the invention is able to sense a level of a fluid and determine a presence of water in the tank.

In one embodiment, an apparatus for measuring a level of a fluid and detecting water in a storage container is provided. The apparatus includes a signal-based fluid level measurement apparatus having a first multistatic probe conveying a first signal and a second multistatic probe conveying a second signal. The first and second multistatic probes are electrically coupled by a float-coupler. The signal-based fluid level measurement apparatus determines the level of the fluid in the storage container based at least in part on a time delay between the first and second signals. This embodiment also includes a water detection device operably coupled to the fluid level measurement apparatus. The water detection device monitors at least one of conduction and a dielectric constant between exposed ends of the first and second multistatic probes such that a presence of the water in the storage tank is detected.

In an embodiment, the water detection device includes a water detection circuit that detects a current between the first and second multistatic probes when the water detection device is monitoring conduction and detects a bulk capacitance of the first and second multistatic probes when the water detection device is monitoring the dielectric constant. In another embodiment, the water detection device includes an excitation circuit that is at least one of a current source and an alternating current (AC) voltage source operating below approximately one gigahertz when the water detection device is monitoring conduction and at least one of an alternating current (AC) voltage source generating a periodic waveform when the water detection device is monitoring the dielectric constant. In yet another embodiment, the water detection device includes an excitation circuit operating below, and a fluid level measurement apparatus operating above, a frequency of approximately one gigahertz.

In an alternate embodiment, an apparatus for measuring a level of a fluid and detecting water in a storage container is provided that includes a flexible probe immersed in the fluid. The flexible probe includes a sleeve holding first and second conductors in spaced relation with the first conductor coupled to a pulse transmitter node, the second conductor coupled to a pulse sampler node, and ends of the first and second conductors penetrating a bottom portion of the sleeve. The apparatus also includes a float coupler moveably coupled to the probe and buoyant upon a surface of the fluid. The float coupler including an internal conductor disposed across and electrically coupling the first and second conductors. A conductive element is also coupled to the pulse transmitter node. A pulse transmitter generates pulses and is coupled to the conductive element. A first resistive element is coupled to a ground and the pulse transmitter node, a second resistive element is coupled to the second conductor and the pulse sampler node, an inductive element is coupled the ground and the pulse sampler node, a pulse sampler is coupled to the pulse sampler node, an excitation source is coupled to the pulse transmitter node, and a detection circuit is coupled to the pulse transmitter node and the ground. A pulse sampler is operably coupled to the second conductor and receives the pulses generated by the pulse transmitter. A delay measurement device is operably coupled to the pulse transmitter and the pulse sampler, and the delay measurement device determines a time delay for the pulses to travel from the pulse transmitter, through the internal conductor of the float coupler, to the pulse sampler. The time of delay indicates a position of the float coupler such that the level of the fluid in the storage container is measured. The apparatus also includes a water detection device operably coupled to the first conductor and the pulse transmitter. This water detection circuit monitors at least one of conduction and a dielectric constant between the ends of the first and second conductors penetrating the bottom portion of the sleeve such that any water in the storage tank is detected.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
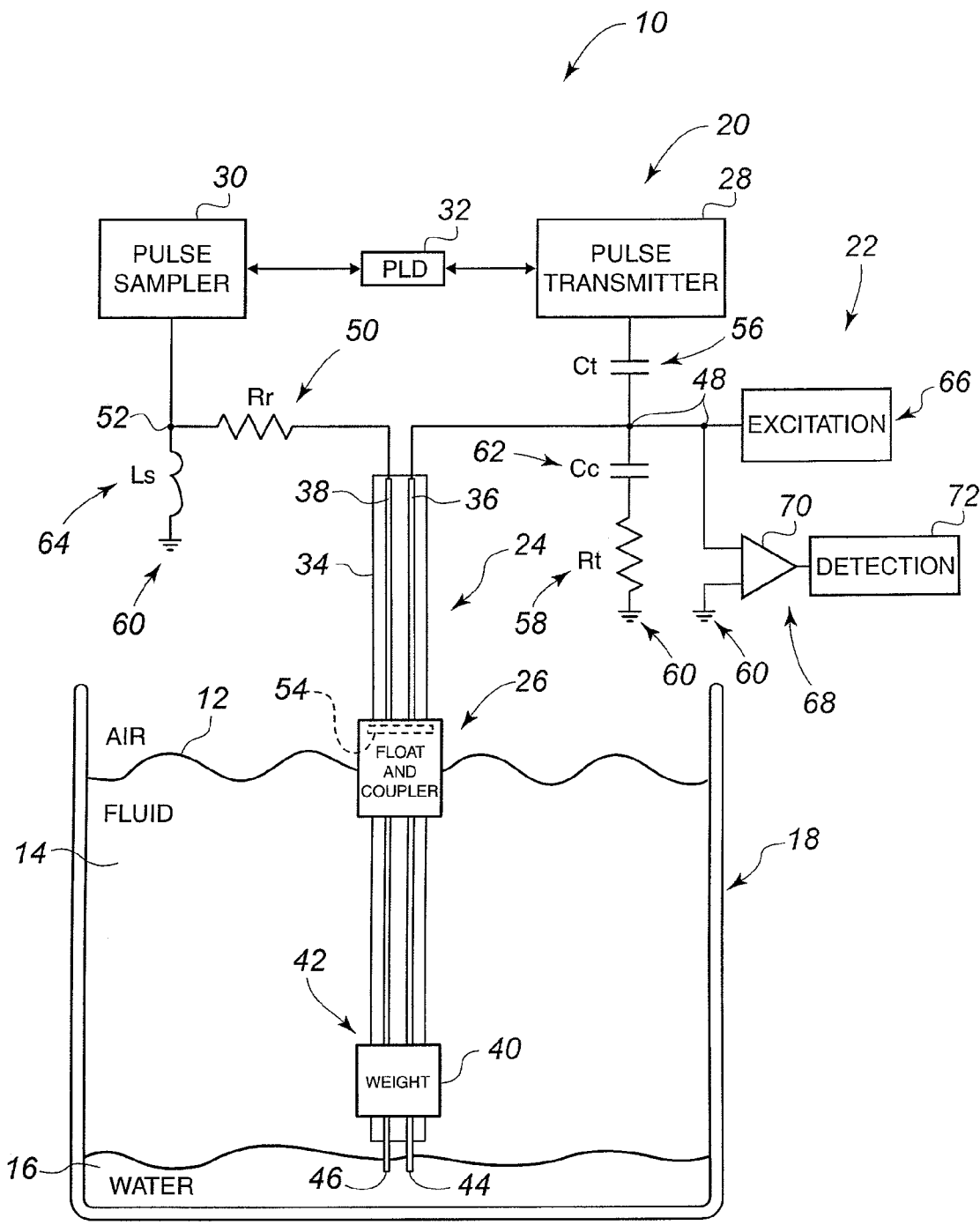
FIG. 1 is a simplified schematic view of an exemplary embodiment of a water detection device constructed in accordance with the teachings of the present invention and coupled to a signal-based fluid level measurement apparatus.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring to FIG. 1, an apparatus 10 for measuring a level 12 of a fluid 14 and detecting water 16 in a storage container 18 is illustrated. In one embodiment, the fluid is a fuel such as, for example, a reformulated gasoline, an alcohol/gasoline mixture, and the like. The apparatus 10 utilizes a signal-based fluid level measurement apparatus 20, which may be bistatic or multistatic, operably coupled to a water detection device 22.

The measurement apparatus 20 includes a flexible probe 24, a float coupler 26, a pulse transmitter 28, a pulse sampler 30, and a delay measurement device (DMD) 32, which is represented in FIG. 1 by a programmable logic device (PLD). The flexible probe 24, which is shown immersed in the fluid 14, is formed by a sleeve 34 holding a first conductor 36 in spaced relation to a second conductor 38. In one embodiment, a weight 40 is secured to a lower portion 42 of the flexible probe 24 to maintain the flexible probe in a vertical orientation. The sleeve 34 is a flat, flexible cable that generally keeps the first and second conductors 36, 38 parallel to each other. In one embodiment, the sleeve 34 is formed from polytetrafluoroethylene (PTFE) or fluorinated ethylene-propylene (FEP).

The first and second conductors 36, 38 can be formed from a variety of suitable conducting materials. An end 44 of the first conductor 36 and an end 46 of the second conductor 38 project from the lower portion 42 of the sleeve 34. As such, the ends 44, 46 are exposed to the fluid 14 and, if present, the water 16 in the storage container 18. Because the first and second conductors 36, 38 are exposed to the air, the fluid 14, and/or the water 16 in the storage container 18, the conductors are formed of a stainless material. The first and second conductors 36, 38 are also preferably formed from a material resistant to corrosion.

The first conductor 36 is coupled to a pulse transmitter node 48 and the second conductor 38 is coupled through a resistive element 50 ($R_r$) to a pulse sampler node 52. In a preferred embodiment, the resistive element 50 is a resistor having a resistance of about ninety Ohms (90Ω).

The float coupler 26 is moveably coupled to the flexible probe 24. Moreover, the float coupler 26 is a configured to float and be buoyant at or near the level 12 or surface of the fluid 14. The float coupler 26 includes an internal conductor 54 generally disposed across and electrically coupling the first and second conductors 36, 38. In one embodiment, the internal conductor 54 is a strip of metal that, along with the first and second conductors 36, 38, forms a capacitive element or a "bulk" capacitor.

The pulse transmitter 28 is a device that generates a pulse or series of pulses (i.e., a radar signal, a radio wave, an electromagnetic signal) that are initially conveyed along the first conductor 36. The pulse transmitter 28 generally produces a signal having a frequency above about one gigahertz (1 GHz). The pulse transmitter 28 is coupled though a capacitive element 56 ($C_t$) (a.k.a., a conductive element) to the pulse transmitter node 48. In one embodiment, the capacitive element 56 has a capacitance of less than about three picofarads (3 pF).

As illustrated in FIG. 1, in one embodiment a resistive element 58 ($R_t$) is interposed between the pulse transmitter node 48 and a ground 60. Preferably, the resistive element 58 is a resistor having a resistance of about ninety Ohms (90Ω). The resistive elements 50, 58 generally match the impedance of the top of the flexible probe 24 to reduce signal reflections.

In the illustrated embodiment, a capacitive element 62 ($C_c$) has been coupled to the pulse transmitter node 48 and the resistive element 58 to isolate that resistive element. If desired, PIN diodes and/or switches can also be used to isolate the resistive element 58. The capacitive element 62 is preferably a capacitor having a capacitance greater than that of capacitive element 56, noted above.

The pulse sampler 30 is a device that receives the pulse or series of pulses that are generated by the pulse transmitter 28 and conveyed along the second conductor 38. In one embodiment, the pulse sampler 30 employs equivalent-time sampling techniques in sampling the pulses. Because the pulse sampler 30 receives pulses, and the pulse transmitter 28 emits pulses, the two devices (operating together with the first and second conductors 36, 38) form a bistatic or multistatic probe. In addition, the measurement apparatus 22 can be referred to as a capacitance-based fluid level detection apparatus as the first and second conductors 36, 38 and the internal conductor 54 form a capacitance between them.

The pulse sampler 30 is coupled to the pulse sampler node 52. An inductive element 64 ($L_s$) is also coupled to the pulse sampler node 52 and the ground 60. Preferably, the inductive element 64 is an inductor with an inductance of about ten nanohenries (10 nH). The inductive element 64 serves as a low frequency shunt so only higher frequency components of a signal reach the pulse sampler 30.

The delay measurement device 32 is operably coupled to the pulse transmitter 28 and the pulse sampler 30. As such, the delay measurement device 32 has the ability to calculate or otherwise determine a time or propagation delay. For example, the delay measurement device 32, which can include other components such as a time source, sensors, and the like, is able to measure the time taken by a pulse to travel from the pulse transmitter 28, along the first conductor 36, across the internal conductor 54, along the second conductor 38, and finally to the pulse sampler 30. In other words, the delay measurement device 32 determines the propagation delay from when the pulse leaves the pulse transmitter 28 to when the pulse is received by the pulse sampler 30.

The water detection device 22 comprises an excitation circuit 66 and a detection circuit 68. The excitation circuit 66 generally produces a signal having a frequency below about one gigahertz (1 GHz), and perhaps far below one gigahertz, during operation. In one embodiment, the excitation circuit 66 is an alternating current (AC) voltage source, a current source, and the like. The detection circuit 68 comprises, for example, an amplifier 70 coupled to the ground 60 and other detection circuitry 72 (e.g., sensors, etc.). The amplifier 70 not only amplifies the signal, but isolates and protects the downstream detection circuitry 72. This is particularly useful if the detection circuitry 72 includes highly sensitive electronic components.

Preferably, the excitation circuit 66 has a high output resistance, and the detection circuit 68 has a high input resistance, compared to the resistive element 58. In addition, while not expressly shown in FIG. 1, the excitation circuit 66 may include an internal resistance (a.k.a., output impedance). Also, while the water detection device 22 is illustrated coupled to the pulse transmitter node 48, the water detection device can be connected to the measurement apparatus 20 at various other locations and still perform as desired. Likewise, the particular arrangement of the capacitive element 62 and the detection device 22 can be altered without detracting from the operation of the invention.

In operation, the apparatus 10 is employed to measure the level 12 of fluid 14 in the storage container 16, as noted above, as well as to detect the water 16, if any, in the storage tank 18 by conduction or by utilizing the relatively high dielectric constant of the water.

When the water 16 in the tank is being detected by conduction, the pulse transmitter 28 is generating, and the pulse sampler is receiving, high frequency signals. In contrast, the excitation circuit 66 is producing low frequency signals. The pulse transmitter 28 and the excitation circuit 66 can generate their respective signals simultaneously or mutually exclusively at predetermined intervals or during particular time periods.

At low frequencies, the inductive element 64 generally forms a short and the capacitive elements 56, 62 generally form an open circuit. As such, if the water 16 is present at the bottom of the storage container 18, a current flows through the flexible probe 24 and between the first and second conductors 36, 38. This current generates a voltage at the pulse transmitter node 48. As a result, the detection circuit 68 reports the presence of the water 16. In contrast, if the water 16 is absent from the storage container 18, no current flows through the flexible probe 24, no voltage drop (or very little voltage drop) is produced at the pulse transmitter node 48 from the internal resistance of the excitation circuit 66, and the detection circuit 68 does not report the presence of the water 16.

Alternatively, when the water 16 in the storage container 18 is being detected by utilizing the relatively high dielectric constant of the water, the bulk capacitance of the flexible probe 24 is measured. In such an embodiment, the excitation circuit 66 produces a periodic waveform such as, for example, a sine wave, a ramp wave, and the like. Also, large but insulated surface areas of the ends 44, 46 of the first and second conductors 36, 38 are exposed to the fluid 16 to form a virtual capacitor element at the lower end 42 of the flexible probe 24 with the water 16 acting as the capacitive medium. The presence of any of the water 16 on this virtual capacitor element, due to the high dielectric constant of the water, greatly changes the bulk capacitance of the flexible probe 24. When the change in bulk capacitance is detected by the detection circuit 68, the detection circuit provides the appropriate indication.

In lieu of detecting the bulk capacitance, the detection device 22 is also able to measure the bulk impedance change (due to capacitance change) or a phase shift between the excitation and detection signals.

From the foregoing, those skilled in the art will recognize that the invention is able to sense a level of a fluid, even when the fluid is a fuel, and to determine a presence of water in the tank.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for measuring a level of a fluid and detecting water in a storage container, the apparatus comprising:
    a signal-based fluid level measurement apparatus having a first multistatic probe conveying a first signal and a second multistatic probe conveying a second signal, the first and second multistatic probes electrically coupled by a float-coupler, the signal-based fluid level measurement apparatus determining the level of the fluid in the storage container based at least in part on a time delay between the first and second signals; and
    a water detection device operably coupled to the fluid level measurement apparatus, the water detection device monitoring at least one of conduction and a dielectric constant between exposed ends of the first and second multistatic probes such that a presence of the water in the storage tank is detected.

2. The apparatus of claim 1, wherein the fluid is a fuel.

3. The apparatus of claim 1, wherein the water detection device includes a water detection circuit, the water detection circuit detecting a current between the first and second multistatic probes when the water detection device is monitoring conduction and detecting a bulk capacitance of the first and second multistatic probes when the water detection device is monitoring the dielectric constant.

4. The apparatus of claim 1, wherein the water detection device includes an excitation circuit, the excitation circuit at least one of a current source and an alternating current (AC) voltage source operating below approximately one gigahertz when the water detection device is monitoring conduction and at least one of an alternating current (AC) voltage source generating a periodic waveform when the water detection device is monitoring the dielectric constant.

5. The apparatus of claim 1, wherein the water detection device includes an excitation circuit, the excitation circuit operating below, and the fluid level measurement apparatus operating above, a frequency of approximately one gigahertz.

6. The apparatus of claim 1, wherein the water detection device includes an operational amplifier, the operational amplifier generating an output when at least one of a current and a voltage is detected.

7. The apparatus of claim 1, wherein the signal-based fluid level measurement apparatus and the water detection device operate simultaneously.

8. An apparatus for measuring a level of a fluid and detecting water in a storage container, the apparatus comprising:
    a flexible probe immersed in the fluid, the flexible probe including a sleeve holding first and second conductors in spaced relation, ends of the first and second conductors projecting from a lower portion of the sleeve;
    a float coupler moveably coupled to the probe and buoyant upon a surface of the fluid, the float coupler including an internal conductor disposed across and electrically coupling the first and second conductors;
    a pulse transmitter operably coupled to the first conductor, the pulse transmitter generating pulses;
    a pulse sampler operably coupled to the second conductor, the pulse sampler receiving the pulses generated by the pulse transmitter;
    a delay measurement device operably coupled to the pulse transmitter and the pulse sampler, the delay measurement device determining a time delay for the pulses to travel from the pulse transmitter, through the internal conductor of the float coupler, to the pulse sampler, the time of delay indicating a position of the float coupler such that the level of the fluid in the storage container is measured; and
    a water detection device operably coupled to the first conductor and the pulse transmitter, the water detection circuit monitoring at least one of conduction and a dielectric constant between the ends of the first and second conductors penetrating the bottom portion of the sleeve such that any of the water in the storage tank is detected.

9. The apparatus of claim 8, wherein the fluid is a fuel selected from the group consisting of a reformulated gasoline and an alcohol/gasoline mixture.

10. The apparatus of claim 8, wherein the sleeve is a flat cable formed from polytetrafluorethylene (PTFE).

11. The apparatus of claim 8, wherein a weight is secured to the lower portion of the flexible probe to maintain a generally vertical orientation of the flexible probe.

12. The apparatus of claim 8, wherein the water detection device includes a water detection circuit, the water detection circuit detecting a current between the first and second conductors when the water detection device is monitoring conduction and detecting a bulk capacitance of the first and second conductors when the water detection device is monitoring the dielectric constant.

13. The apparatus of claim 8, wherein the pulse sampler samples the pulses using equivalent-time sampling.

14. The apparatus of claim 8, wherein the pulse transmitter generates pulses above approximately one gigahertz and the water detection device operates below approximately one gigahertz.

15. An apparatus for measuring a level of a fluid and detecting water in a storage container, the apparatus comprising:
    a flexible probe immersed in the fluid, the flexible probe including a sleeve holding first and second conductors in spaced relation, the first conductor coupled to a pulse transmitter node, the second conductor coupled to a pulse sampler node, and ends of the first and second conductors penetrating a bottom portion of the sleeve;
    a float coupler moveably coupled to the probe and buoyant upon a surface of the fluid, the float coupler including an internal conductor disposed across and electrically coupling the first and second conductors;
    a conductive element coupled to the pulse transmitter node;
    a pulse transmitter generating pulses and coupled to the conductive element;
    a first resistive element coupled to a ground and the pulse transmitter node;
    a second resistive element coupled to the second conductor and the pulse sampler node;
    an inductive element coupled the ground and the pulse sampler node;
    a pulse sampler coupled to the pulse sampler node;
    an excitation source coupled to the pulse transmitter node;
    a detection circuit coupled to the pulse transmitter node and the ground;

a pulse sampler operably coupled to the second conductor, the pulse sampler receiving the pulses generated by the pulse transmitter;

a delay measurement device operably coupled to the pulse transmitter and the pulse sampler, the delay measurement device determining a time delay for the pulses to travel from the pulse transmitter, through the internal conductor of the float coupler, to the pulse sampler, the time of delay indicating a position of the float coupler such that the level of the fluid in the storage container is measured; and a water detection device operably coupled to the first conductor and the pulse transmitter, the water detection circuit monitoring at least one of conduction and a dielectric constant between the ends of the first and second conductors penetrating the bottom portion of the sleeve such that any of the water in the storage tank is detected.

16. The apparatus of claim 15, wherein a second conductive element is interposed between the first resistive element and the pulse transmitter node.

17. The apparatus of claim 15, wherein the first conductive element has a capacitance of less than about three picofarads.

18. The apparatus of claim 15, wherein the first and second resistive elements each have a resistance of about ninety ohms.

19. The apparatus of claim 15, wherein the inductive element has an inductance of about ten nanohenries.

20. The apparatus of claim 15, wherein the excitation circuit operates below a frequency of approximately one gigahertz.

* * * * *

UNITED STATES PATENT AND TRADEMARK OFFICE
CERTIFICATE OF CORRECTION

PATENT NO. : 7,634,945 B2  Page 1 of 1
APPLICATION NO. : 11/955922
DATED : December 22, 2009
INVENTOR(S) : James Robert Champion It is certified that error appears in the above-identified patent and that said Letters Patent is hereby corrected as shown below:

On the title page, in the title: item (54);

After Apparatus, delete "to" and replace with --for--

In column 1, line 1, after Apparatus, delete "to" and replace with --for--

Signed and Sealed this

Sixteenth Day of March, 2010

David J. Kappos
*Director of the United States Patent and Trademark Office*